(12) United States Patent
    Higgins

(10) Patent No.: US 10,794,272 B2
(45) Date of Patent: Oct. 6, 2020

(54) AXIAL AND CENTRIFUGAL COMPRESSOR

(71) Applicant: General Electric Company, Schenectady, NY (US)

(72) Inventor: Timothy Joseph Higgins, Newburyport, MA (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 15/898,786

(22) Filed: Feb. 19, 2018

(65) Prior Publication Data

US 2019/0257246 A1    Aug. 22, 2019

(51) Int. Cl.
    *F02C 3/08*    (2006.01)
    *F02C 9/18*    (2006.01)
    *F02C 9/20*    (2006.01)
    *F01D 17/10*   (2006.01)

(52) U.S. Cl.
    CPC .............. *F02C 3/08* (2013.01); *F01D 17/105* (2013.01); *F02C 9/18* (2013.01); *F02C 9/20* (2013.01); *F05D 2220/32* (2013.01); *F05D 2260/56* (2013.01); *F05D 2260/57* (2013.01)

(58) Field of Classification Search
    None
    See application file for complete search history.

(56) References Cited

U.S. PATENT DOCUMENTS

| 2,941,354 A | 6/1960 | Sobey, Jr. | |
| 3,638,428 A * | 2/1972 | Shipley | F02K 3/075 60/226.1 |
| 4,989,403 A | 2/1991 | Rodgers | |
| 5,184,459 A * | 2/1993 | McAndrews | F01D 17/162 415/149.2 |
| 5,281,087 A * | 1/1994 | Hines | F01D 17/162 415/160 |
| 5,657,631 A * | 8/1997 | Androsov | F23D 11/402 239/403 |
| 5,775,092 A * | 7/1998 | Hines | F02K 3/075 60/726 |
| 5,845,482 A * | 12/1998 | Carscallen | F01D 17/105 60/785 |
| 6,905,303 B2 | 6/2005 | Liu et al. | |
| 6,997,676 B2 | 2/2006 | Koshoffer | |
| 7,980,083 B2 | 7/2011 | Yu | |

(Continued)

FOREIGN PATENT DOCUMENTS

| EP | 3150827 A1 * | 4/2017 | ......... F04D 27/0207 |
| FR | 2433106 A1 | 3/1980 | |
| GB | 704856 A | 3/1954 | |

*Primary Examiner* — Michael Lebrentritt
(74) *Attorney, Agent, or Firm* — Dority & Manning, P.A.

(57) ABSTRACT

A turbine engine includes a compressor section including a compressor, the compressor including an axial compressor stage, a variable outlet guide vane, and a centrifugal compressor stage, the variable outlet guide vane positioned between the axial compressor stage and the centrifugal compressor stage; a bleed assembly including a bleed airflow duct in airflow communication with the compressor and a bleed valve operable with the bleed airflow duct, the bleed valve including a bleed valve actuator; and a linkage assembly coupling the bleed valve actuator with the variable outlet guide vane such that that variable outlet guide vane is moveable with the bleed valve.

20 Claims, 6 Drawing Sheets

(56) References Cited

U.S. PATENT DOCUMENTS

| | | | |
|---|---|---|---|
| 8,452,516 B1* | 5/2013 | Rose | F01D 17/162 |
| | | | 701/100 |
| 8,499,544 B2 | 8/2013 | Shafer et al. | |
| 8,863,529 B2 | 10/2014 | Starr | |
| 9,623,354 B2 | 4/2017 | Kumar et al. | |
| 9,810,158 B2* | 11/2017 | Foutch | F02C 9/18 |
| 10,329,945 B2* | 6/2019 | Salunkhe | F01D 17/14 |
| 2007/0013195 A1* | 1/2007 | Mukavetz | F01D 17/162 |
| | | | 290/52 |
| 2007/0080262 A1* | 4/2007 | Aronsson | F01D 17/10 |
| | | | 244/215 |
| 2007/0245739 A1* | 10/2007 | Stretton | F01D 17/105 |
| | | | 60/728 |
| 2009/0056307 A1* | 3/2009 | Mons | F01D 17/14 |
| | | | 60/226.3 |
| 2009/0139202 A1* | 6/2009 | Agrawal | F02C 6/206 |
| | | | 60/226.3 |
| 2010/0232935 A1* | 9/2010 | Twell | F01D 17/162 |
| | | | 415/151 |
| 2011/0056210 A1* | 3/2011 | Griffin | F02C 9/18 |
| | | | 60/773 |
| 2012/0087780 A1* | 4/2012 | Suciu | F01D 17/162 |
| | | | 415/159 |
| 2012/0275912 A1* | 11/2012 | Moniz | F01D 17/105 |
| | | | 415/199.5 |
| 2013/0097992 A1* | 4/2013 | Suciu | F02C 7/08 |
| | | | 60/39.83 |
| 2014/0093350 A1* | 4/2014 | Meisner | F01D 17/00 |
| | | | 415/1 |
| 2014/0109589 A1* | 4/2014 | Pritchard, Jr. | F02K 3/075 |
| | | | 60/779 |
| 2016/0153361 A1* | 6/2016 | Morin | F02C 3/13 |
| | | | 137/343 |
| 2017/0058783 A1* | 3/2017 | Tan | F02C 9/18 |
| 2017/0183976 A1* | 6/2017 | Moniz | F01D 17/145 |
| 2017/0248156 A1* | 8/2017 | Parker | F04D 19/02 |
| 2018/0223741 A1* | 8/2018 | Little | F02C 6/08 |
| 2019/0055889 A1* | 2/2019 | Heims | F02C 6/08 |
| 2019/0145420 A1* | 5/2019 | Schwarz | F02C 6/08 |

* cited by examiner

AXIAL AND CENTRIFUGAL COMPRESSOR

FEDERALLY SPONSORED RESEARCH AND DEVELOPMENT

The U.S. Government may have certain rights in this invention pursuant to contract no W911W6-11-2-0009 awarded by the Department of Defense.

FIELD

This invention relates generally to turbine engines, and more particularly relates to variable stator and bleed elements for a compressor of the turbine engine.

BACKGROUND

A gas turbine engine includes, in serial flow communication, a compressor, a combustor, and turbine collectively constituting a turbomachinery core. The core is operable in a known manner, in conjunction with other engine components, to perform useful work, such as providing propulsive thrust or mechanical work. One known configuration of the compressor is an "axi-centrifugal" compressor which includes an upstream axial-flow portion that discharges through a duct to a downstream centrifugal flow portion.

Because of cycle demands for high pressure ratio and high efficiency, the diffuser throat flow area at the downstream end of the axi-centrifugal compressor is sized for high power operations. At part-speed conditions, however, the maximum flow of the centrifugal portion of the compressor maybe less than the minimum stable flow of the axial compressor (i.e., the axial compressor may be pushed beyond its stall line). In prior art designs, compressor stability is achieved by extracting or "bleeding" excess flow from the compressor, or alternatively by using outlet guide vanes with a variable effective angle in the axial portion in order to throttle mass flow. Both of these methods require separate components and control algorithms to operate based on, e.g., one or more engine operating conditions. Such may require a relatively large amount of computing power, and further, relatively heavy and/or expensive components.

Accordingly, there remains a need for an axi-centrifugal compressor that is operable with good efficiency at varying flow rates.

BRIEF DESCRIPTION

Aspects and advantages of the invention will be set forth in part in the following description, or may be obvious from the description, or may be learned through practice of the invention.

In one exemplary aspect of the present disclosure, a turbine engine is provided. The turbine engine includes a compressor section including a compressor, the compressor including an axial compressor stage, a variable outlet guide vane, and a centrifugal compressor stage, the variable outlet guide vane positioned between the axial compressor stage and the centrifugal compressor stage; a bleed assembly including a bleed airflow duct in airflow communication with the compressor and a bleed valve operable with the bleed airflow duct, the bleed valve including a bleed valve actuator; and a linkage assembly coupling the bleed valve actuator with the variable outlet guide vane such that that variable outlet guide vane is moveable with the bleed valve.

In certain exemplary embodiments the linkage assembly is a mechanical linkage assembly.

In certain exemplary embodiments the compressor of the compressor section is an axi-centrifugal compressor.

In certain exemplary embodiments the compressor further includes a plurality of axial compressor stages, and wherein the variable outlet guide vane is positioned downstream of each of the plurality of axial compressor stages.

In certain exemplary embodiments the bleed valve is positioned at least partially within the bleed duct.

For example, in certain exemplary embodiments the bleed valve further includes a flapper positioned within the bleed duct, and wherein the flapper is coupled to the bleed valve actuator.

For example, in certain exemplary embodiments the linkage assembly includes a gear, a pulley, a belt, crank, or a combination of these components.

For example, in certain exemplary embodiments the bleed valve includes a bleed valve shaft coupled to the bleed valve actuator, and wherein the linkage assembly includes a bell crank coupled to the bleed valve shaft.

In certain exemplary embodiments the bleed valve is movable between an open position and a closed position, wherein the bleed valve allows for a bleed airflow through the bleed assembly from the compressor when the bleed valve is in the open position, and wherein the bleed valve prevents a bleed airflow through the bleed assembly from the compressor when the bleed valve is in the closed position.

In certain exemplary embodiments the bleed duct is in airflow communication with the compressor at a location upstream of the variable outlet guide vane.

In certain exemplary embodiments the linkage assembly includes a first bell crank and a first linkage, and wherein the first bell crank is coupled to the variable outlet guide vane through the first linkage.

For example, in certain exemplary embodiments the linkage assembly further includes a second bell crank and a second linkage, wherein the second bell crank is coupled to the bleed valve and is further coupled to the first bell crank through the second linkage.

In another exemplary embodiment of the present disclosure, a compressor section of an engine is provided. The compressor section includes a compressor including an axial compressor stage, a variable outlet guide vane, and a centrifugal compressor stage, the variable outlet guide vane positioned between the axial compressor stage and the centrifugal compressor stage; a bleed assembly including a bleed airflow duct in airflow communication with the compressor and a bleed valve operable with the bleed airflow duct; an actuator; and a linkage assembly, the actuator coupled to one of the bleed valve or the variable outlet guide vane and the linkage assembly coupling the actuator to the other of the bleed valve or the variable outlet guide vane such that that variable outlet guide vane is moveable with the bleed valve.

In certain exemplary embodiments the actuator is a bleed valve actuator configured as part of the bleed assembly.

For example, in certain exemplary embodiments the bleed valve actuator is coupled to the bleed valve, and wherein the linkage assembly couples the bleed valve actuator to the variable outlet guide vane.

In certain exemplary embodiments the linkage assembly includes a first bell crank and a first linkage, and wherein the first bell crank is coupled to the variable outlet guide vane through the first linkage.

For example, in certain exemplary embodiments the linkage assembly further includes a second bell crank and a second linkage, wherein the second bell crank is coupled to the bleed valve and is further coupled to the first bell crank through the second linkage.

For example, in certain exemplary embodiments the actuator is a bleed valve actuator, wherein the bleed valve includes a bleed valve shaft coupled to the bleed valve actuator, and wherein the linkage assembly includes a bell crank coupled to the bleed valve shaft.

In certain exemplary embodiments the linkage assembly is a mechanical linkage assembly.

In certain exemplary embodiments the compressor of the compressor section is an axi-centrifugal compressor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
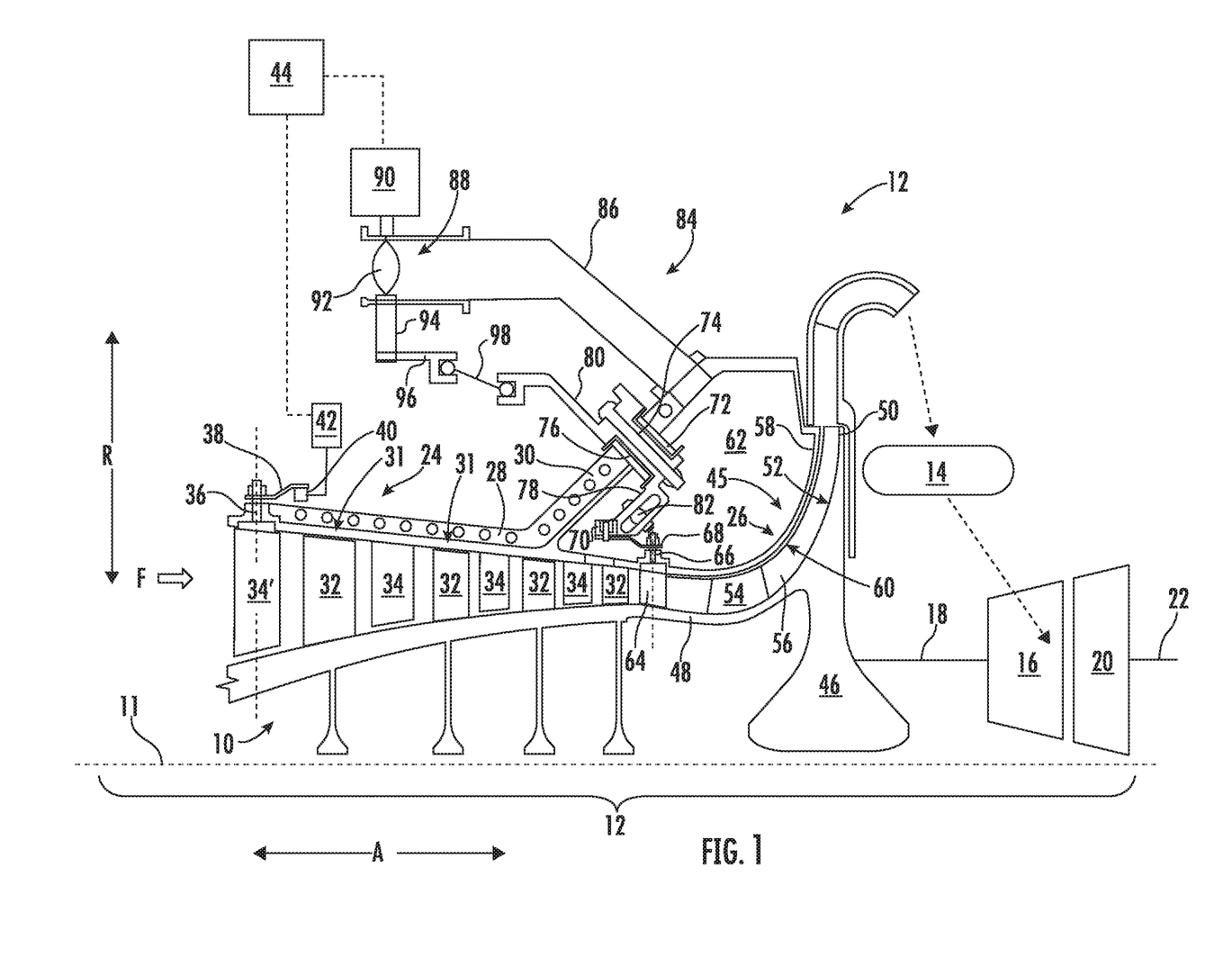
FIG. 1 is a schematic cross-sectional view of a gas turbine engine in accordance with an exemplary embodiment of the present disclosure.

Referring to the drawings wherein identical reference numerals denote the same elements throughout the various views, FIG. 1 depicts an exemplary compressor 10 constructed in accordance with an aspect of the present disclosure. In the illustrated example, the compressor 10 is incorporated into a gas turbine engine 12 with a central longitudinal axis 11 and including in sequential flow sequence, the compressor 10, a combustor 14, and a gas generator turbine 16 (the combustor 14 and the gas generator turbine 16 are shown schematically). The gas generator engine 16 generally defines an axial direction A extending along the longitudinal axis 11, a radial direction R perpendicular to the axial direction A, and a circumferential direction C extending about the axial direction A. As used herein, the terms "axial" and "longitudinal" both refer to a direction parallel to the axial direction A, while "radial" refers to the radial direction R, and "tangential" or "circumferential" refers to the circumferential direction C. As used herein, the terms "forward" or "front" refer to a location relatively upstream in an air flow passing through or around a component, and the terms "aft" or "rear" refer to a location relatively downstream in an air flow passing through or around a component. Moreover, the direction of this flow through the gas turbine engine 12 is shown by the arrow "F" in FIG. 1. These directional terms are used merely for convenience in description and do not require a particular orientation of the structures described thereby unless stated otherwise.

During operation, the compressor 10 provides compressed air that passes primarily into the combustor 14 to support combustion and partially around the combustor 14 where it may be used to cool both the combustor liners (not shown) and turbomachinery (e.g., the gas generator turbine 16 and work turbine 20, noted below) further downstream. Further, it will be appreciated that fuel may be introduced into the combustor 14 and mixed with the air in a conventional fashion. The resulting fuel-air mixture may flow into the combustor 14 where it is ignited to generate hot combustion gases. The hot combustion gases are discharged to the gas generator turbine 16 where they are expanded so that energy is extracted. The gas generator turbine 16 drives the compressor 10 through a shaft 18. In the illustrated example, the engine 12 is a turboshaft engine and a work turbine (also called a power turbine) 20 is located downstream of the gas generator turbine 16 and coupled to an output shaft 22 which can be connected to a mechanical load. However, the principles described herein are equally applicable to any compressor having one or more centrifugal stages, such as an axi-centrifugal compressor (shown) or a dual centrifugal compressor. Further, the principles herein may apply to a compressor driven by an external prime mover.

Referring still to FIG. 1, the compressor 10 includes an upstream portion 24 and a downstream portion 26. An annular casing 28 surrounds the entire compressor 10. As viewed in cross-section, an aft portion of the casing 28 includes an outer skirt 30 that diverges radially outward from the main body of the casing 28, forming a "Y" shape. The upstream portion 24 of the compressor 10 is configured for axial fluid flow and may also be referred to as an axial-flow portion or simply an axial portion. It includes a number of axial compressor stages 31, each of which includes a row of rotating airfoils or blades 32. The upstream portion 24 additionally includes a plurality of rows of stationary airfoils or vanes 34, each positioned upstream or downstream of a row of rotating blades 32. The vanes 34 serve to turn the airflow exiting an upstream row of blades 32 before it enters the downstream row of blades 32.

Additionally, one or more of the rows of guide vanes 34 may be configured as variable stator vanes or simply "VSVs." For example, for the embodiment depicted, the compressor 10 includes a first stage of VSVs 34' at a forward end of the compressor 10 (or rather at a forward end of the upstream portion 24 of the compressor 10, upstream of the plurality of axial compressor stages 31). The vanes 34' of this stage are constructed so that their angle of incidence (also referred to as "stagger angle," described below) can be changed in operation (i.e., these VSVs 34' can be pivoted about their respective axes shown in dashed lines). The VSVs 34' enable throttling of flow through the upstream portion 24 in a known manner, so that it can operate more efficiently at both high and low mass flow rates. It will be appreciated, however, from the discussion below that in at least certain exemplary embodiments, the compressor 10 may not include the row of VSVs 34' at the upstream end of the upstream portion 24 compressor 10.

Referring still to the embodiment shown, however, the vanes 34' of the forward stage of VSVs each has a corresponding trunnion 36 that extends radially outward through the casing 28. An actuator arm 38 is attached to a distal end of each trunnion 36. All of the actuator arms 38 for an individual stage are coupled together by a unison ring 40. Rotation of the unison ring 40 about the engine's longitudinal axis 11 thus causes all of the actuator arms 28 coupled to that ring 40 to move in unison, in turn pivoting all of the trunnions 36 with their attached stator vanes 34' in unison. Any known type of actuator that is effective to turn the unison rings 40 may be used to operate the VSVs 34'. For example, hydraulic or electrical linear actuators may be used for this purpose. In the illustrated example, an actuator 42 is shown schematically, coupled to the unison ring 40. The actuator 42 may be operably connected to a controller 44, shown schematically in FIG. 1. The controller 44 is generally a device capable of sending control signals to the actuator 42 and/or controlling a flow of energy from an energy, such as pressurized fluid or electrical power. The controller 44 may be part of known engine control device such as a hydro-mechanical unit, a power management unit ("PMU"), a full authority digital electronic control ("FADEC"), etc.

Referring still to FIG. 1, the downstream portion 26 of the compressor 10 is configured for centrifugal or mixed axial-centrifugal fluid flow, and accordingly may be referred to as a centrifugal-flow portion or simply a centrifugal portion. Accordingly, it will be appreciated that the compressor generally includes an axial compressor stage 31 (or rather a plurality of axial compressor stages 31) in the upstream portion 24 of the compressor 10 and a centrifugal compressor stage 45 in the downstream portion 26 of the compressor 10.

The centrifugal compressor stage 45 includes an impeller 46 mounted for rotation with the shaft 18, and having axially forward and aft ends 48, 50. The impeller 46 defines a generally concave-curved inner flowpath surface 52. The inner flowpath surface 52 extends in a generally longitudinal/axial direction A towards the forward end 48 and extends in a generally radial direction near the aft end 50. An annular array of airfoil-shaped impeller blades 54 extend radially outward from the inner flowpath surface 52. The impeller blades 54 are configured in terms of their dimensions, cross-sectional shape, orientation, spacing, and other parameters to provide an incremental pressure increase to the air flowing past them as the impeller 46 rotates. An annular array of splitter blades 56 alternate with the impeller blades 54 around the circumference of the impeller 46. The splitter blades 56 are similar in form to the impeller blades 54 but are shorter in axial length. It will be appreciated, however, that in other exemplary embodiments, the centrifugal compressor stage 45 may not have the splitter blades 56, or may have any other suitable design.

An annular shroud assembly 58 surrounds the impeller 46. The shroud assembly 58 defines a generally convex-curved outer flowpath surface 60 that closely surrounds the tips of the impeller and splitter blades 54 and 56. Together the inner and outer flowpath surfaces 52 and 60 define a primary flowpath through the downstream portion 26. A forward end of the shroud assembly 58 adjoins the casing 28, and the casing 28, its outer skirt 30, and the shroud assembly 58 collectively define the boundaries of an annular plenum 62.

Furthermore, the compressor 10 includes a variable outlet guide vane 64 position between the axial compressor stage 31, or rather the plurality of axial compressor stages 31 of the upstream portion 24 of the compressor 10, and the centrifugal compressor stage 45 of the downstream portion 26 of the compressor. More specifically, the compressor includes a plurality of variable outlet guide vanes (each of which may be airfoil-shaped) ("OGVs") 64. The variable OGVs 64 are constructed so that their stagger angle (described below with reference to FIGS. 4 and 5) can be changed in operation (i.e., the variable OGVs 64 can be pivoted about their respective axes, as is shown by a dashed line). The variable OGVs 64 enable changing a swirl (i.e., a tangential velocity) of flow from the upstream portion 24 entering the downstream portion 26 and may further enable any throttling down of an airflow from the upstream portion 24, as explained in more detail below. The row of variable OGVs 64 includes a plurality of actuation members to enable such functionality. More specifically, each variable OGV 64 has a corresponding trunnion 66 that extends radially outward through the casing 28, into the plenum 62. An actuator arm 68 is attached to the distal end of each trunnion 66. All of the actuator arms 68 for the OGVs 64 are coupled together by a unison ring 70 disposed inside the plenum 62.

It will be appreciated, however, that the plurality of actuation members (i.e., the actuator arms 68, trunnions 66, and unison ring 70) are provided by way of example only.

In other exemplary embodiments, any other suitable configuration may be provided for rotating/pivoting the variable OGVs 64.

Further, for the embodiment shown the gas turbine engine includes a bleed assembly 84 for receiving and exhausting bleed airflow from the compressor 10. The bleed assembly 84 generally includes a bleed airflow duct 86 in airflow communication with the compressor 10 and a bleed valve 88 positioned at least partially within the bleed airflow duct 86 and operable with the bleed airflow duct 86 to modulate an amount of airflow allowable therethrough. More specifically, the bleed airflow duct 86 is in airflow communication with the plenum 62, which, in turn, is in airflow communication with the compressor 10, and more specifically, the flowpath through the compressor 10. For example, for the embodiment depicted, the outer casing 28 of the compressor 10 includes an opening 90 configured to allow an airflow from the compressor 10 into the plenum 62, and subsequently into the bleed airflow duct 86. In such a manner, it will be appreciated that the bleed airflow duct 86 is in airflow communication with the compressor 10 at a location upstream of the variable OGVs 64.

Figure 2:
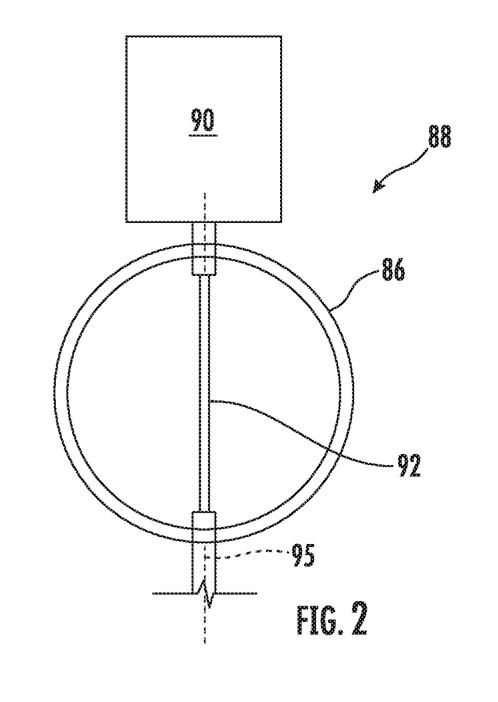
FIG. 2 is a cross-sectional view of a bleed assembly including a bleed valve in accordance with an exemplary embodiment present disclosure in an open position.
Figure 3:
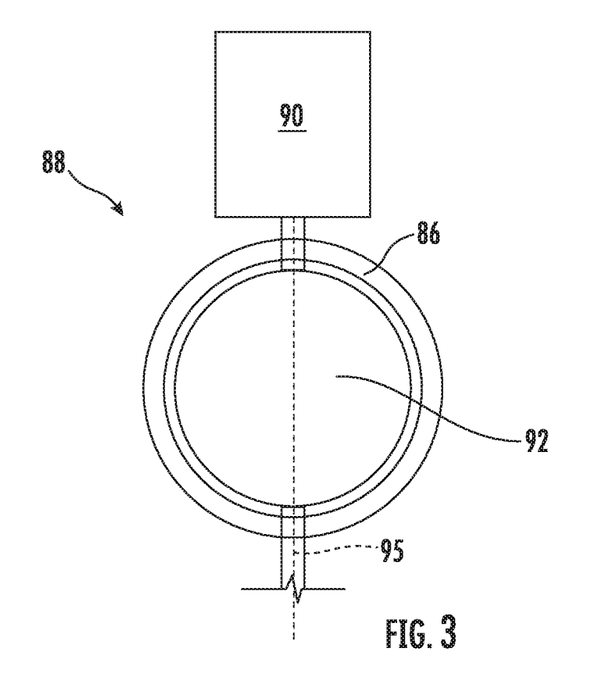
FIG. 3 is a cross-sectional view of the exemplary bleed assembly and bleed valve of FIG. 2 in a closed position.

Moreover, the bleed valve 88 includes a bleed valve actuator 90 and a flapper 92. Referring briefly now also to FIGS. 2 and 3, providing cross-sectional views of the bleed valve 88, it will be appreciated that the flapper 92 is positioned within the bleed airflow duct 86. More particularly, the bleed valve 88 includes a shaft 94 coupled to the bleed valve actuator 90 and the flapper 92, such that the bleed valve actuator 90 may move the flapper 92 about an axis 95 of the shaft 94 to open up or close off the bleed airflow duct 86. The bleed valve actuator 90 may be configured in certain exemplary embodiments as any suitable type of actuator, such as a hydraulic actuator or electrical linear actuator. The bleed valve actuator 90 is, for the embodiment depicted, operably connected to the controller 44 shown schematically in FIG. 1.

Accordingly, referring still generally to FIGS. 1 through 3, it will be appreciated that the bleed valve 88 is generally movable between an open position (i.e., when the flapper 92 opens up the bleed airflow duct 86; shown in FIG. 2) and a closed position (i.e., when the flapper 92 closes off the bleed airflow duct 86; shown in FIG. 3). In such a manner, it will be appreciated that the bleed valve 88 is configured to allow for a bleed airflow through the bleed assembly 84 from the compressor 10 when the bleed valve 88 is in the open position (FIG. 2), and further that the bleed valve 88 is configured to prevent a bleed airflow through the bleed assembly 84 from the compressor 10 when the bleed valve 88 is in a closed position (FIG. 3). Notably, the bleed valve 88 may also be moveable to one or more intermediate positions (i.e., between the open position of FIG. 2 and the closed position of FIG. 3) to allow some intermediate fraction of a full amount of bleed airflow through the bleed airflow duct 86.

Referring back particularly to FIG. 1, it will further be appreciated that the exemplary gas turbine engine depicted includes a linkage assembly 94 coupling the bleed valve actuator 90 of the bleed assembly 84 with the variable outlet guide vane 64, or rather the plurality of variable OGVs 64, such that the plurality of variable OGVs 64 are movable with the bleed valve 88.

Figure 4:
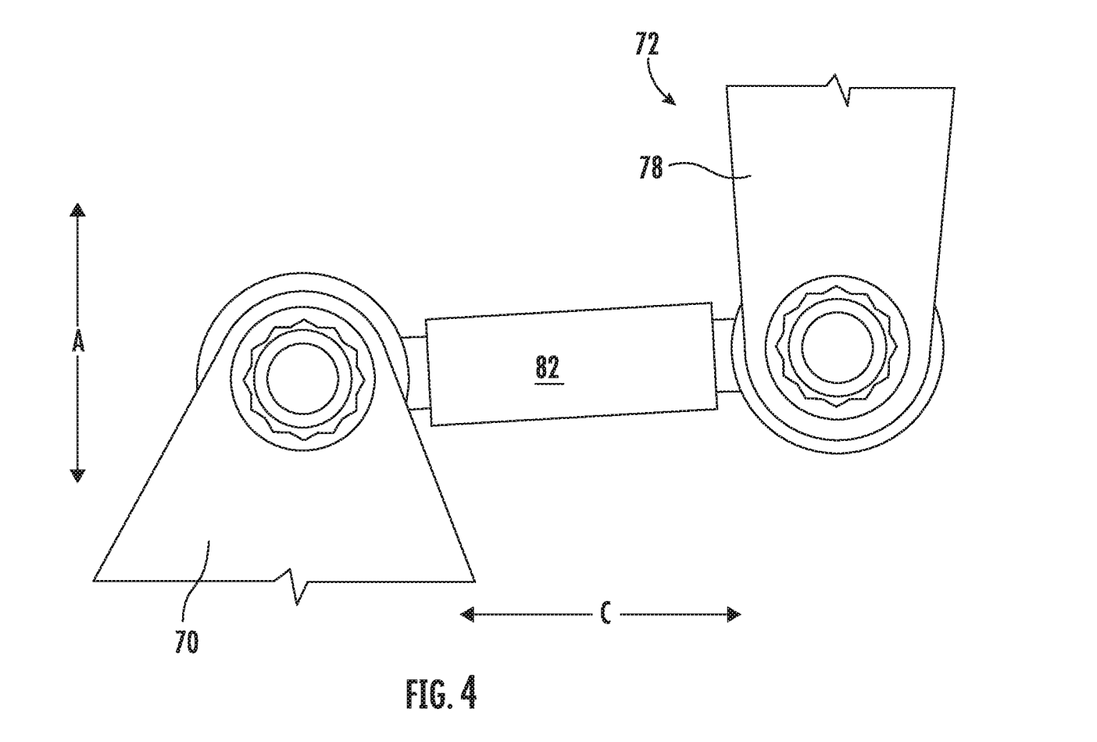
FIG. 4 is a top view of a portion of a linkage assembly in accordance with an exemplary embodiment present disclosure.
Figure 5:
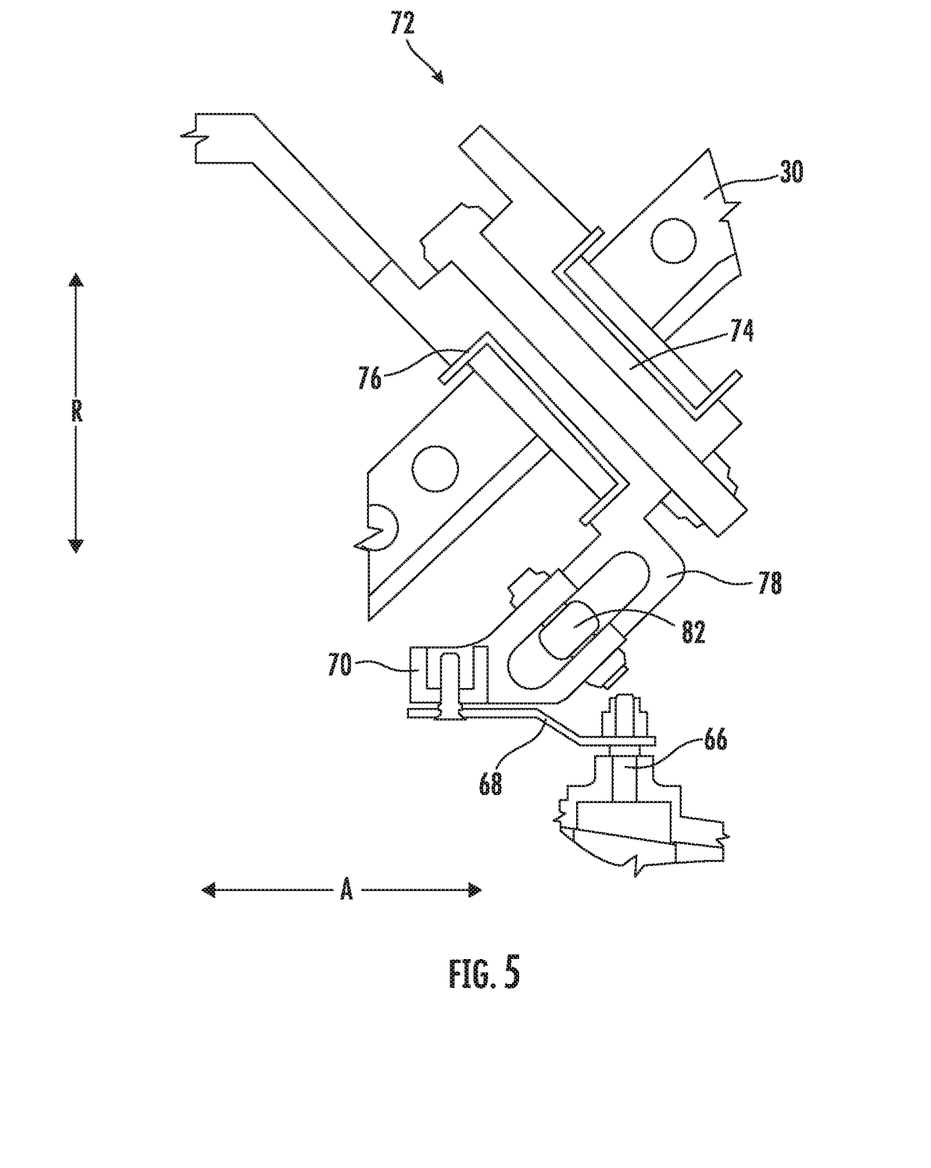
FIG. 5 is a close-up view of a portion of the exemplary linkage assembly of FIG. 4.

More particularly, referring now also to FIGS. 4 and 5, a portion of the linkage assembly 94 coupled to the plurality of variable OGVs 64 will first be described. FIG. 2 depicts a top view of a connection of a first bell crank 72 to the unison ring 70, and FIG. 3 provides a close-up view of a portion of the first bell crank 72 of the linkage assembly 94 extending through the outer skirt 30.

For example, as is shown, the first bell crank 72 is mounted in the outer skirt 30 at approximately the same axial position as the OGVs 64. The first bell crank 72 includes a barrel 74 mounted for rotation in a bushing 76 in the outer skirt 30, an inner arm 78 disposed in the plenum 62, and an outer arm 80 disposed outside the outer skirt 30. The inner and outer arms 78 and 80 rotate as a unit with the barrel 74. A distal end of the inner arm 78 is connected to the unison ring 70 by a link 82 which extends in a generally tangential/circumferential direction C (FIG. 4).

Figure 6:
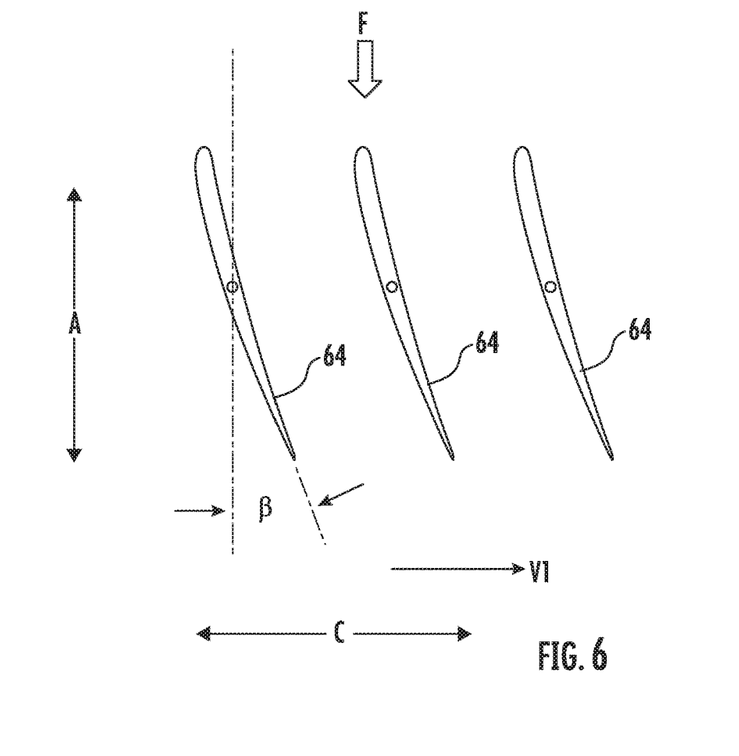
FIG. 6 is a top view of a plurality of variable outlet guide vanes in accordance with an exemplary embodiment present disclosure in a first position.
Figure 7:
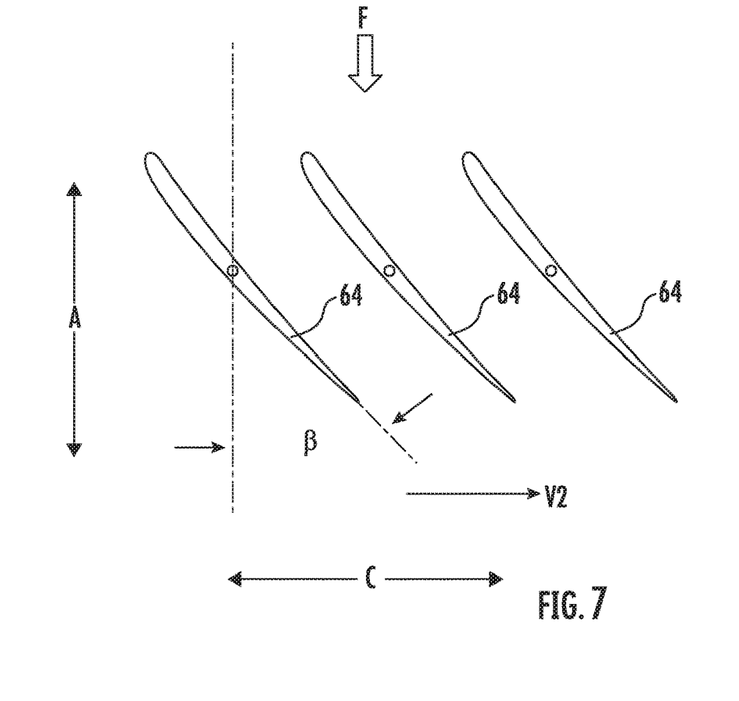
FIG. 7 is a top view of the exemplary variable outlet guide vanes of FIG. 6 in a second position.

It will further be appreciated that a pivoting of the first bell crank 72 causes rotation of the unison ring 70. Rotation of the unison ring 70 about the engine's longitudinal axis 11 thus causes all of the actuator arms 68 coupled to the unison ring 70 to move in unison, in turn pivoting all of the trunnions 66 with their attached OGVs 64 simultaneously. Such a pivoting of the trunnions 66 with their attached OGVs 64 may allow for the OGVs 64 to be driven to a desired stagger angle. For example, referring briefly to FIGS. 6 and 7, each providing cross-sectional views of the plurality of variable OGVs 64 of FIG. 1 along the radial direction, FIG. 6 illustrates the OGVs 64 at a first relatively open stagger angle β and FIG. 7 illustrates the OGVs 64 at a second relatively closed stagger angle β. Positioning the plurality of variable OGVs 64 such that they define the first relatively open stagger angle β would result in a first, relatively lower tangential velocity "V1" or swirl of the flow passing therethrough. By contrast, positioning the plurality of variable OGVs 64 such that they define the second relatively closed stagger angle β would result in a second, relatively higher tangential velocity "V2" or swirl of the flow passing therethrough.

Figure 8:
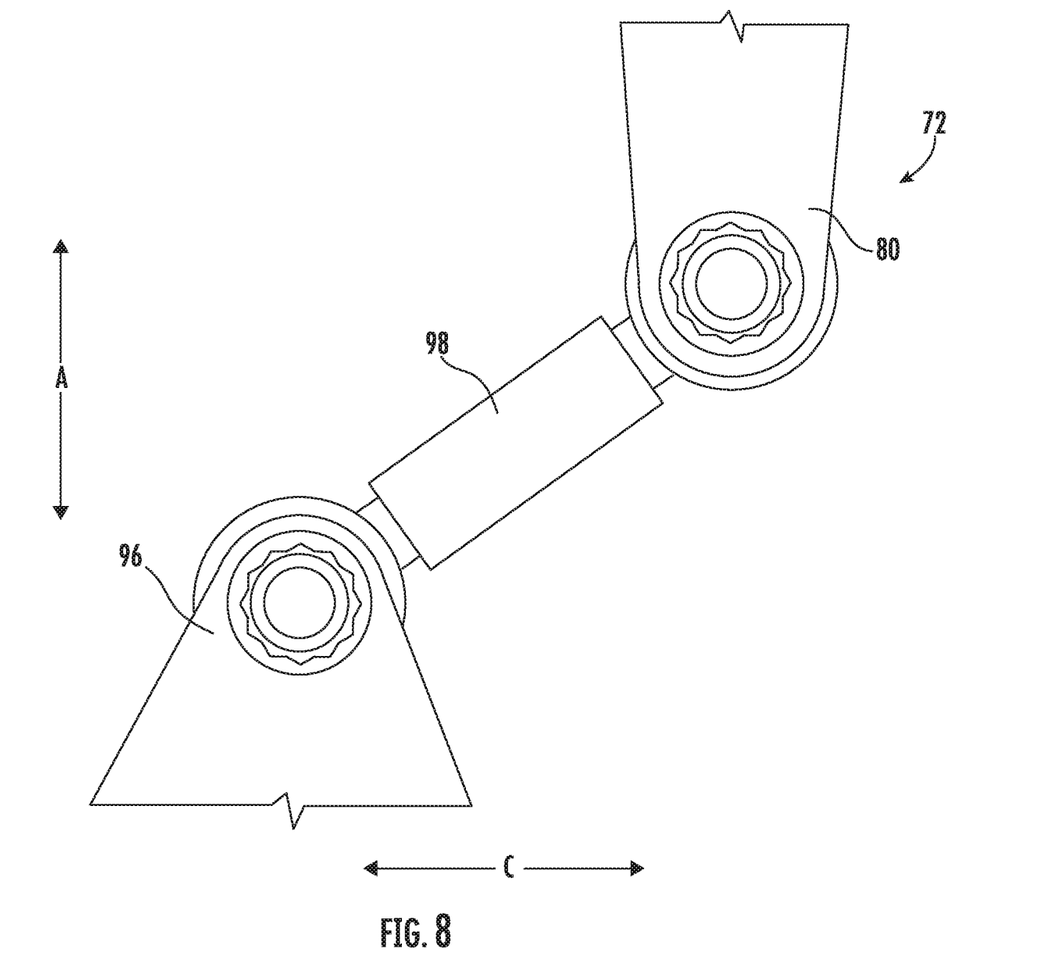
FIG. 8 is a top view of another portion of the exemplary linkage assembly of FIG. 4.

Referring back to FIG. 1, it will further be appreciated that the linkage assembly 94 further includes a second bell crank 96 coupled to the bleed valve shaft 94. Accordingly, the second bell crank 96 is moved by the bleed valve actuator 90 with the bleed valve 88. Further, the second bell crank 96 is coupled to the bleed valve shaft 94 and is, in turn, mechanically coupled to the outer arm 80 of the first bell crank 72 via a linkage 98. Referring briefly to FIG. 8, providing a top view of the linkage 98, it will be appreciated that the linkage 98 between the outer arm 80 of the first bell crank 72 and the second bell crank 96 coupled to the shaft 94 of the bleed valve actuator 90 may be configured in a similar manner as the linkage 82 between the inner arm 78 of the first bell crank 72 and the unison ring 70 (see FIG. 2). More specifically, as shown, the linkage 98 extends generally (or at least partially) along the transverse/circumferential direction C between the first bell crank 72 and the second bell crank 96.

In such a manner, it will be appreciated that the linkage assembly 94 couples the bleed valve actuator 90 with the variable outlet guide vane 64, or rather the plurality of variable OGVs 64, such that the plurality of variable OGVs 64 are movable with the bleed valve 88, and more specifically, movable with the flapper 92 of the bleed valve 88. Further, it will be appreciated that for the embodiment shown, the linkage assembly 94 is a completely mechanical linkage assembly, and further that the stagger angle of the plurality of variable OGVs 64 is therefore directly tied to the amount of bleed airflow allowed through the bleed assembly 84 by the bleed valve 88.

Notably, such may be beneficial given that the compressor 10 is capable of operating both at lower rotor speeds with lower mass flow and pressure ratio and at higher rotor speeds with higher mass flow and pressure ratio. As a general principle, the mass flow of the upstream and downstream portions 24 and 26 is inherently well-matched at higher power conditions (e.g., cruise power). However, at partial power conditions the maximum flow through the downstream portion 26 of the compressor 10 is lower than required for stable operation of the upstream portion 24. According to the principles of the present disclosure, under such partial power conditions the bleed valve 88 may be opened (i.e., for the embodiment of FIG. 1, the flapper 92 may be moved towards the open position, see FIG. 2), and simultaneously, the OGVs 64 may be "opened" (see FIG. 5) a corresponding amount automatically using a single actuator operated using a single control algorithm (due to the mechanical linkage assembly 94). This reduces an airflow entering the downstream portion 26, while simultaneously lowering the swirl in the flow entering the downstream portion 26. This has the effect of increasing the pressure ratio and flow rate of the downstream portion 26, such that the flow rates are better matched during such partial power conditions.

Accordingly, it will be appreciated that inclusion of a linkage assembly in accordance with an exemplary embodiment of the present disclosure may provide for a simpler and more efficient gas turbine engine. For example, inclusion of a linkage assembly in accordance with an exemplary embodiment of the present disclosure may allow for an engine to control both an amount of bleed air allowed through a bleed assembly and a swirl of the airflow from an upstream portion to a downstream portion without requiring two separate actuators (reducing weight and cost) and without requiring two separate control algorithms (increasing a simplicity of a controller). Additionally, such a configuration permits the variable OGVs to be operated without having to locate an actuator in the relatively high-temperature, crowded confines of the plenum.

Notably, however, it will be appreciated that the exemplary linkage assembly and gas turbine engine provided above are by way of example only. In other exemplary embodiments, the linkage assembly may have any other suitable configuration. For example, in other exemplary embodiments, the linkage assembly may utilize any other suitable mechanical linkage members, such as one or more pulleys, belts, cranks, etc., or a combination of two or more of these components. Additionally, or alternatively, the linkage assembly may utilize any other suitable configuration for directly transferring a force from the bleed valve actuator to the variable OGVs. For example, the linkage assembly may additionally, or alternatively, utilize one or more pneumatic or hydraulic force transfer assemblies to link movement of the variable OGVs with the bleed valve.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine engine comprising:
   a compressor section comprising a compressor, the compressor comprising an axial compressor stage, a variable outlet guide vane, and a centrifugal compressor stage, the variable outlet guide vane positioned between the axial compressor stage and the centrifugal compressor stage;
   a bleed assembly comprising a bleed airflow duct in airflow communication with the compressor and a bleed valve operable with the bleed airflow duct, the bleed valve comprising a bleed valve actuator; and
   a linkage assembly coupling the bleed valve actuator with the variable outlet guide vane such that that variable outlet guide vane is moveable with the bleed valve.

2. The turbine engine of claim 1, wherein the linkage assembly is a mechanical linkage assembly.

3. The turbine engine of claim 1, wherein the compressor of the compressor section is an axi-centrifugal compressor.

4. The turbine engine of claim 1, wherein the compressor further comprises a plurality of axial compressor stages, and wherein the variable outlet guide vane is positioned downstream of each of the plurality of axial compressor stages.

5. The turbine engine of claim 1, wherein the bleed valve is positioned at least partially within the bleed duct.

6. The turbine engine of claim 5, wherein the bleed valve further comprises a flapper positioned within the bleed duct, and wherein the flapper is coupled to the bleed valve actuator.

7. The turbine engine of claim 1, wherein the linkage assembly comprises a gear, a pulley, a belt, crank, or a combination of these components.

8. The turbine engine of claim 1, wherein the bleed valve comprises a bleed valve shaft coupled to the bleed valve actuator, and wherein the linkage assembly includes a bell crank coupled to the bleed valve shaft.

9. The turbine engine of claim 1, wherein the bleed valve is movable between an open position and a closed position, wherein the bleed valve allows for a bleed airflow through the bleed assembly from the compressor when the bleed valve is in the open position, and wherein the bleed valve prevents a bleed airflow through the bleed assembly from the compressor when the bleed valve is in the closed position.

10. The turbine engine of claim 1, wherein the bleed duct is in airflow communication with the compressor at a location upstream of the variable outlet guide vane.

11. The turbine engine of claim 1, wherein the linkage assembly includes a first bell crank and a first linkage, and wherein the first bell crank is coupled to the variable outlet guide vane through the first linkage.

12. The turbine engine of claim 11, wherein the linkage assembly further includes a second bell crank and a second linkage, wherein the second bell crank is coupled to the bleed valve and is further coupled to the first bell crank through the second linkage.

13. A compressor section of an engine comprising:
   a compressor comprising an axial compressor stage, a variable outlet guide vane, and a centrifugal compressor stage, the variable outlet guide vane positioned between the axial compressor stage and the centrifugal compressor stage;
   a bleed assembly comprising a bleed airflow duct in airflow communication with the compressor and a bleed valve operable with the bleed airflow duct;
   an actuator; and
   a linkage assembly, the actuator coupled to one of the bleed valve or the variable outlet guide vane and the linkage assembly coupling the actuator to the other of the bleed valve or the variable outlet guide vane such that that variable outlet guide vane is moveable with the bleed valve.

14. The compressor section of claim 13, wherein the actuator is a bleed valve actuator configured as part of the bleed assembly.

15. The compressor section of claim 14, wherein the bleed valve actuator is coupled to the bleed valve, and wherein the linkage assembly couples the bleed valve actuator to the variable outlet guide vane.

16. The compressor section of claim 13, wherein the linkage assembly includes a first bell crank and a first linkage, and wherein the first bell crank is coupled to the variable outlet guide vane through the first linkage.

17. The compressor section of claim 16, wherein the linkage assembly further includes a second bell crank and a second linkage, wherein the second bell crank is coupled to the bleed valve and is further coupled to the first bell crank through the second linkage.

18. The compressor section of claim 16, wherein the actuator is a bleed valve actuator, wherein the bleed valve comprises a bleed valve shaft coupled to the bleed valve actuator, and wherein the linkage assembly includes a bell crank coupled to the bleed valve shaft.

19. The compressor section of claim 13, wherein the linkage assembly is a mechanical linkage assembly.

20. The compressor section of claim 13, wherein the compressor of the compressor section is an axi-centrifugal compressor.

\* \* \* \* \*